W. DEVAULT.
Surveying-Instrument.
No. 219,076.                    Patented Sept. 2, 1879.
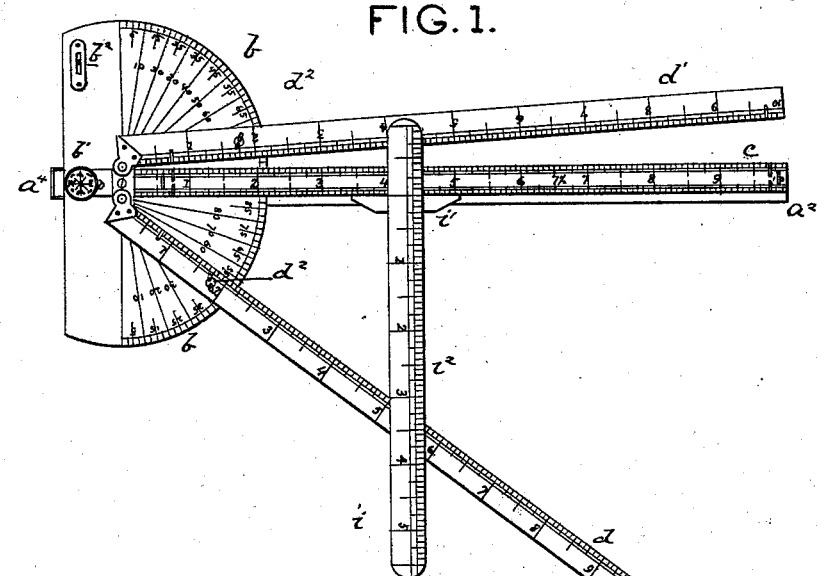
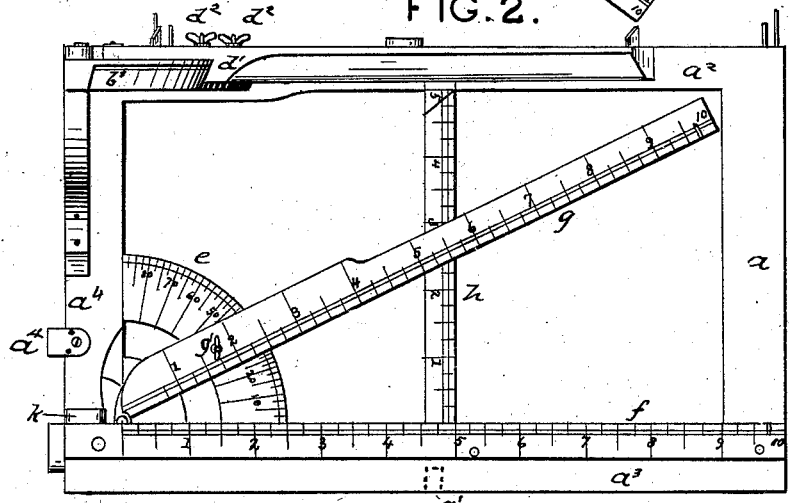
Witnesses:
Sam'l R. Turner
J. B. Holderby
Inventor:
William Devault
By R. S. & A. P. Lacey
Att'ys

UNITED STATES PATENT OFFICE.

WILLIAM DEVAULT, OF COPE, OHIO.

IMPROVEMENT IN SURVEYING-INSTRUMENTS.

Specification forming part of Letters Patent No. 219,076, dated September 2, 1879; application filed June 17, 1879.

*To all whom it may concern:*

Be it known that I, WILLIAM DEVAULT, of Cope, in the county of Belmont and State of Ohio, have invented certain new and useful Improvements in Surveyors' Instruments; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish an improved instrument for surveyors and engineers, whereby the contents of land-distances, &c., may be calculated and measured readily; and it consists in the construction and arrangement of the several parts hereinafter described, and pointed out in the claim.

In the drawings, Figure 1 is a plan view, and Fig. 2 is a side elevation, of an instrument constructed according to my invention.

$a$ is a vertical frame, provided with a socket, $a^1$, adapted to be placed on the pin of ordinary tripods or surveyor's staff. At one end, and in a suitable mortise just below the upper surface of the top bar, $a^2$, of the frame $a$, I place the horizontal quadrant $b$, and also affix thereto, in a suitable manner, the compass $b^1$ and the level $b^2$. The quadrant is arranged to have its center and its ninetieth degree on the center of the bar $a^2$, and the needle $b$ is also arranged on the central line of the said bar. Suitable sights are provided to guide the vision.

On the upper side of the bar $a^2$, or on a metal plate affixed thereto, I form a graduated scale, $c$, commencing coincident with the center of the quadrant $b$.

$d\ d^1$ are two graduated arms, which are hinged to the top bar, $a^2$, with their initial or other degrees or measures coinciding with the initial and other degrees or measures of the scale $c$, and so that they may be turned to any degree indicated by the quadrant $c$. Each is provided with a flange or projection, which extends down over the edge of the quadrant, and is provided with a guide-pin, which slides in a groove, $b^3$, and insures steadiness of movement. Each arm is also provided with a set-screw, $d^2$, by which it may be held at any desired point on the quadrant.

Within the lower angle of the frame $a$, below the quadrant $b$, I place a vertical quadrant, $e$, which has its center in the same vertical plane and line with the center of the said horizontal quadrant $b$.

To the side of the frame and to the lower bar, $a^3$, I place a fixed horizontal scale, $f$, and the hinged quadrant-arm $g$, which have their initial points coincident with the center of the quadrant $e$, and are graduated to correspond with the scales $c$, $d$, and $d^1$. The arm $g$ is provided with a thumb-nut $g'$, by which it is held in place on the quadrant $e$.

$h$ is a vertical scale, fixed centrally in the frame $a$, and is used, together with the scale $f$, in measuring elevations by the arm $g$. The arm $g$ has suitable sights to guide the vision.

$i$ is a try-square, composed of the foot $i^1$ and the standard $i^2$. The foot $i^1$ is placed against the bar or scale $c$, while the standard $i^2$ extends over into one of the arms $d\ d^1$, as may be required. In measuring elevations the foot is placed on the scale $f$, and the standard extends up into the side of the scale $g$. When not in use the try-square is shipped into a loop, $a^4$, where it is held securely and out of way. The standard $i$ is graduated in inches or degrees to correspond exactly with the graduations on the other scales in the device.

In the side of the device I place a level, $k$, at right angles to the level $b^2$. By means of the two levels the device can be adjusted in manner well known to surveyors and others who use instruments of this kind.

In using the instrument the upper bar, $a^2$, with the scale $c$, is, by preference, considered as the meridian or line forming the base of the triangles and rectangles by which the contents of a tract are calculated; but this is not absolutely necessary, for either one of the arms $d\ d^1$ may be, and often is, from necessity made the base or meridian.

In Fig. 3 I have shown a plat of ground, the contents of which are calculated by my instrument as follows: The instrument is placed at station A, with the central bar, $a^2$, on the meridian A E. The arm $d$ is turned outward until it points west thirty-seven degrees, east one hundred rods, to station B. I assume, for convenience, for the present calculations, that the number of divisions of the graduated scales on the instrument are one-fifth of an inch in length. On the scale the arm $d$ will be represented the length of the line A B. I now place the try-square $i$ with its foot against the side of the meridian $a^2$, with its standard crossing the arm $d$ at a point, 5, which indicates one hundred rods according to the above assumption. The standard will cross the bar $a^2$ at 4, which would indicate a distance four-fifths as large as that indicated on the arm $d$—i. e., it would indicate eighty rods—while the standard itself would give three-fifths, or sixty rods. By this I get the sides of the right-angle triangle A B $B^1$, as follows: Base A $B^1$=80 rods; perpendicular B $B^1$=60 rods; hypotenuse A B=100. From these the contents of the triangle are found to be two thousand four hundred square rods, which amount is set off in the margin of the field-book. The instrument is now moved to station B, and the bar $a^2$ arranged on the meridian B $B^2$, and the arm $d$ directed by the next bearing—namely, north sixty degrees, east one hundred and fifty rods, to station C.

Now, by a process similar to that described in obtaining the sides of the triangle A B $B^1$, we find the sides of the triangle B B C. The line $B^2$ C, being at right angles to the line B $B^2$, is also at right angles to the line A E, with which B $B^2$ is parallel. The length (one hundred and fifty rods) of the line B C being known, the length of the line B $B^2$ is found to be seventy-two rods and the line $B^2$ C to be one hundred and forty-four rods. From this the contents of the triangle B $B^2$ C are found to be five thousand one hundred and eighty-four rods. The sides B $B^1$ and B $B^2$ of the rectangle B $B^2$ $C^1$ $B^1$ being 60 and 72, respectively, the contents are found to be four thousand three hundred and twenty rods, which, added to the contents of the triangle B $B^2$ C, gives nine thousand five hundred and four square rods as the contents of the figure B C $C^1$ $B^1$, which contents are set in the field-book under the contents of the first triangle, A B $B^1$.

In a similar manner the contents of the triangle C $C^2$ D and of the entire figure C D D′ E are found. The several are then added together, which gives the entire contents of the tract A B C D E.

Where the general direction to any given point, as in the present case, is north from A to E, and a line is run in an opposite direction—as, for instance—south from any given station, the contents which would be from such measurement would be marked a minus quantity, and it would be subtracted from the aggregate of all the contents derived from the north bearings.

If the tract shown in Fig. 3 were extended west of the line A E and the bearings taken south from E, the same general rules apply as to the calculations, which rules are well understood by all surveyors and civil engineers.

Where the distances are measured up a hill, the bearing is taken as hereinbefore explained, and the elevation is taken by the arm $g$ and the scale $f$, the height of the station being determined by the try-square on the scales $g$ and $f$, and the contents of the tract by the scales $c$, $d$, and $d^1$, as hereinbefore explained.

Various calculations may be made by this instrument, as the heights of trees, of objects across streams of water or other impassable objects, &c.

I have illustrated the finding of the contents of a tract of land. The other uses will be readily comprehended by persons familiar with the use of such instruments.

It will be understood that by this instrument the bearing and elevation of a station may be taken at one and the same time. If the station be on a hill and cannot be seen along the leveled arm $a^2$, I set the instrument with the leveled arm showing the proper bearing east or west, or north or south, as the case may be. I then raise the arm $g$ until the sight along it strikes the station. Then, by means of the try-square and the measurements, as hereinbefore explained, the distance and the elevation can be obtained by the scales on the arms $d$, $d^1$, and $a^2$ and the scales on the bar $f$ and hinged arm $g$, the degree of elevation being shown by the quadrant $e$, fixed in the frame, as described.

What I claim as my invention is—

The combination, with the vertical frame $a$, having the scale $c$ on its upper bar, $a^2$, horizontal protractor $b$, fixed on the rear end of the bar $a^2$, and arms $d$ $d^1$, provided with graduated scales, as described, and hinged at the center of the protractor $b$, of the horizontal scale $f$, fixed to the side of the lower bar, $a^3$, of the frame $a$, quadrant $e$, fixed in a vertical position in the angle between the vertical end bar, $a^4$, and lower bar, $a^3$, of frame $a$, and arm $g$, provided with a graduated scale and hinged to the center of the quadrant $e$, so that it turns in a vertical plane, substantially as and for the purposes set forth.

In testimony that I claim the foregoing as my own I affix my signature in presence of two witnesses.

WILLIAM DEVAULT.

Witnesses:
LIZZIE K. DUTTON,
JANE C. SHARON.